United States Patent
Kuurne et al.

(10) Patent No.: US 7,167,681 B2
(45) Date of Patent: Jan. 23, 2007

(54) ANTENNA ADJUSTMENT METHOD, SYSTEM AND NETWORK ELEMENT

(75) Inventors: Antti Kuurne, Espoo (FI); Ari Hämäläinen, Vantaa (FI); Achim Wacker, Espoo (FI); Kari Sipilä, Vantaa (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 10/648,769

(22) Filed: Aug. 27, 2003

(65) Prior Publication Data
US 2004/0266352 A1  Dec. 30, 2004

(30) Foreign Application Priority Data
Jun. 27, 2003 (FI) .................................. 20030964

(51) Int. Cl.
*H04B 17/00* (2006.01)

(52) U.S. Cl. .................. 455/67.11; 455/63.1; 455/450; 455/501; 455/446; 455/447; 455/562.1; 455/67.13; 370/330; 370/337; 370/331; 342/374; 342/372

(58) Field of Classification Search ............... 455/63.1, 455/67.11, 450, 442, 443, 446, 447, 501, 455/67.13, 562.1; 370/330, 337, 329, 331
See application file for complete search history.

(56) References Cited

U.S. PATENT DOCUMENTS

| | | | | |
|---|---|---|---|---|
| 5,565,873 A | * | 10/1996 | Dean | 342/372 |
| 5,570,098 A | * | 10/1996 | Searle et al. | 342/374 |
| 5,576,717 A | * | 11/1996 | Searle et al. | 342/373 |
| 5,590,399 A | * | 12/1996 | Matsumoto et al. | 455/449 |
| 5,844,894 A | * | 12/1998 | Dent | 370/330 |
| 5,930,716 A | * | 7/1999 | Sonetaka | 455/450 |
| 6,091,955 A | * | 7/2000 | Aalto et al. | 455/447 |
| 6,137,991 A | * | 10/2000 | Isaksson | 455/67.11 |
| 6,154,654 A | * | 11/2000 | Mao | 455/446 |
| 6,201,972 B1 | * | 3/2001 | Hamabe | 455/450 |
| 6,229,796 B1 | * | 5/2001 | Dent | 370/335 |

\* cited by examiner

*Primary Examiner*—Marceau Milord
(74) *Attorney, Agent, or Firm*—Squire, Sanders & Dempsey L.L.P.

(57) ABSTRACT

According to one embodiment of the invention, an antenna adjustment method, system and network element is provided. The system includes a mechanism for gathering information on interference in predetermined radio cells, a mechanism for arranging the gathered information radio cell-specifically for processing, a mechanism for determining a tilting factor for each predetermined radio cell, wherein the tilting factor relates to the interference the radio cell produces to other cells, and a mechanism for searching for the radio cells having the antenna tilting factors that fulfill a set criteria.

24 Claims, 3 Drawing Sheets

ANTENNA ADJUSTMENT METHOD, SYSTEM AND NETWORK ELEMENT

BACKGROUND OF THE INVENTION

1. Field of the Invention

The invention relates to an antenna adjustment method, system and network element of a communication system.

2. Description of the Related Art

In Code Division Multiple Access (CDMA) networks where all the cells share the same frequency, the planning of cell service areas is critical. If the overlap of two CDMA cells is increased, the quality degradation due to interference also increases, as the processing gain does not totally eliminate the influence of the interference. The size of a radio cell can only be affected without hardware changes by changing the transmitted power or antenna configuration (e.g. antenna tilting or antenna bearing). Changing the power potentially requires a base station reset which means clearing the cell of traffic. A base station is also called a node B in UMTS (Universal Mobile Telecommunications System). Additionally, reducing cell power will decrease the received power throughout the cell area, not only on cell edges. Antenna bearing is usually costly to change.

The prior art method for finding out a suitable antenna tilting is based on planning tool predictions on cell service areas. Drive test measurements have been used to complete planning tool results, but this is expensive and time consuming. Each sector has several possible tilt angles for an antenna: the total number of different tilt configurations is $A^B$ (A to power B), where A is the number of different tilt settings per cell and B is the number of cells in the network. For a large city, this number of different tilt configurations might be in the order of $10^{1000}$. As can be seen, the problem is that, in practice, it is impossible to try all antenna tilting combinations or even a significant portion of them to determine the best configuration.

SUMMARY OF THE INVENTION

The invention provides an improved antenna adjustment method, system and a network element of a communication system. According to an aspect of the invention, there is provided an antenna adjustment method, including: gathering information on interference in predetermined radio cells, arranging the gathered information radio cell-specifically for processing, determining a tilting factor for each predetermined radio cell which tilting factor relates to the interference the radio cell produces to other cells, searching for the radio cells having the antenna tilting factors that fulfill a set criteria, and tilting the antennas of the searched radio cells.

According to another embodiment of the invention, there is provided an antenna adjustment system, including: means for gathering information on interference in predetermined radio cells, means for arranging the gathered information radio cell-specifically for processing, means for determining a tilting factor for each predetermined radio cell, wherein the tilting factor relates to the interference the radio cell produces to other cells and means for searching for the radio cells having the antenna tilting factors that fulfill a set criteria.

According to another embodiment of the invention, there is provided a network element for adjusting antennas including: means for gathering information on interference in predetermined radio cells, means for arranging the gathered information radio cell-specifically for processing, means for determining a tilting factor for each predetermined radio cell, wherein the tilting factor relates to the interference that the radio cell produces to other cells and means for searching for the radio cells having the antenna tilting factors that fulfill a set criteria.

According to another embodiment of the invention, there is provided an antenna adjustment system configured to: gather information on interference in predetermined radio cells, arrange the gathered information radio cell-specifically for processing, determine a tilting factor for each predetermined radio cell, wherein the tilting factor relates to the interference the radio cell produces to other cells and search for the radio cells having the antenna tilting factors that fulfill a set criteria.

According to another embodiment of the invention, there is provided a network element for adjusting antennas configured to: gather information on interference in predetermined radio cells, arrange the gathered information radio cell-specifically for processing, determine a tilting factor for each predetermined radio cell, wherein the tilting factor relates to the interference the radio cell produces to other cells and search for the radio cells having the antenna tilting factors that fulfill a set criteria.

One embodiment of the invention uses pilot-channel signal-strength measurements carried out by a user terminal to give an indication of which cells should be down-tilted. Statistical information on the measurements is composed, and based on this statistical information it is clarified which cells overlap with many other cells and should therefore be tilted down to reduce the overlap area. Alternatively, soft handover statistics may be used to determine the cells having a large overlap with other cells.

The method and system of the invention provide several advantages. For example, an embodiment of the invention saves measurement time and resources. Another advantage is that a actual user distribution is taken into account in determining the antenna tilting.

BRIEF DESCRIPTION OF THE DRAWINGS

In the following, the invention will be described in greater detail with reference to the preferred embodiments and the accompanying drawings, in which.

DETAILED DESCRIPTION OF THE DRAWINGS

Figure 1:
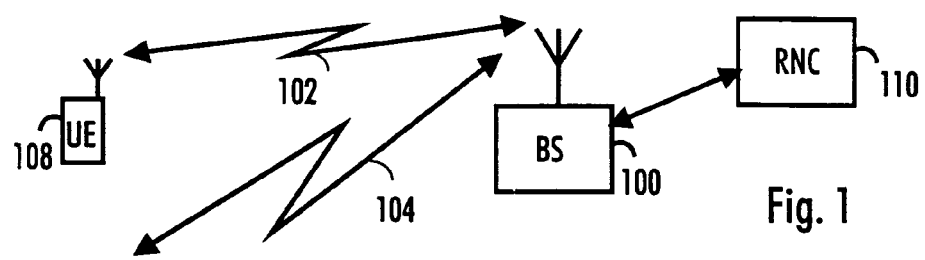
FIG. 1 shows an example of a communication system.

With reference to FIG. 1, an example of a data transmission system to which the preferred embodiments of the invention can be applied is shown. The invention can be applied to various wireless communication systems. One example of such a communication system is UMTS (Universal Mobile Telecommunications System) radio access network. It is a radio access network which includes WCDMA (wideband code division multiple access) technology and can also offer real-time IP-based (Internet Protocol) services which are, for example, IP telephony (IPT), IP-based streaming and IP-multimedia via a connection to an IP network. It is clear to one skilled in the art that the method according to the invention can be applied to systems that utilize different modulation methods or air interface standards.

FIG. 1 is a simplified illustration of a digital data transmission system to which the embodiments according to the invention are applicable. As shown in the example of FIG. 1, this is a part of a cellular radio system, which includes a base station (or a node B as it is also called) 100, which has bi-directional radio links 102 and 104 to subscriber terminals 106 and 108. The subscriber terminals may be fixed, vehicle-mounted or portable. The base station includes transmitters, for instance. From transceivers of the base station, there is a connection to an antenna unit, which establishes the bi-directional radio links to the subscriber terminal. The base station is further connected to a radio network controller 110, which transmits the connections of the terminals to the other parts of the network. The base station controller controls in a centralized manner several base stations connected to it.

The cellular radio system can also communicate with other networks such as a public switched telephone network or the Internet.

The embodiments are not, however, restricted to the system given as example, but one skilled in the art may apply the invention to other radio systems provided with the necessary properties.

Figure 2:
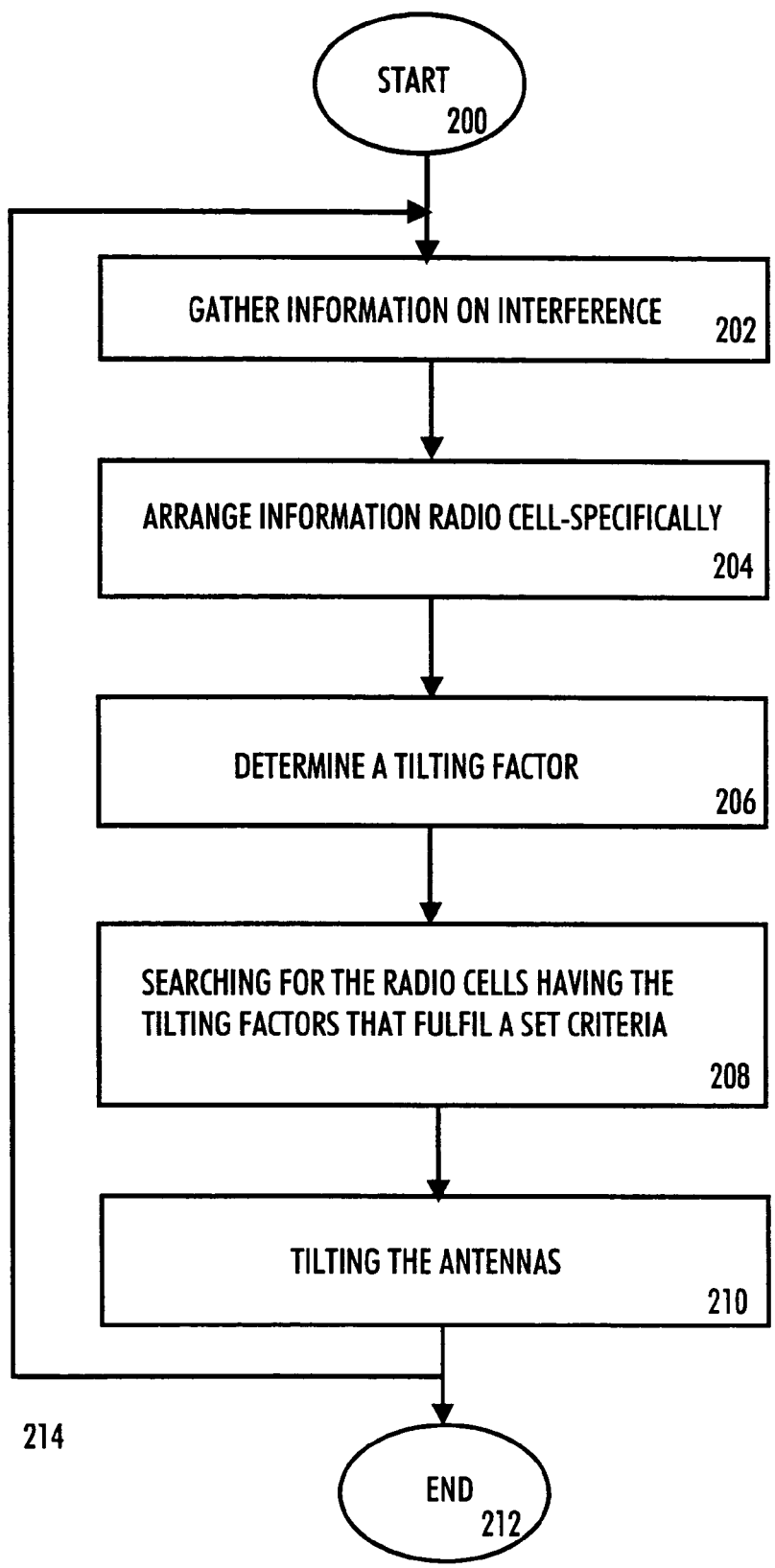
FIG. 2 is a flow chart of a method for decreasing cell interference according to one embodiment of the invention.

FIG. 2 is a flow chart showing one embodiment of an antenna adjustment method for decreasing other-to-own cell interference that exists in overlapping areas in cellular communication systems. The embodiment is a method with which it is possible to cut the required time and save resources in finding out the cells where the antennas should be tilted. The aim of the embodiment is, in other words, to obtain a list of candidate cells to be tilted. The tilting is often down-tilting.

Figure 3:
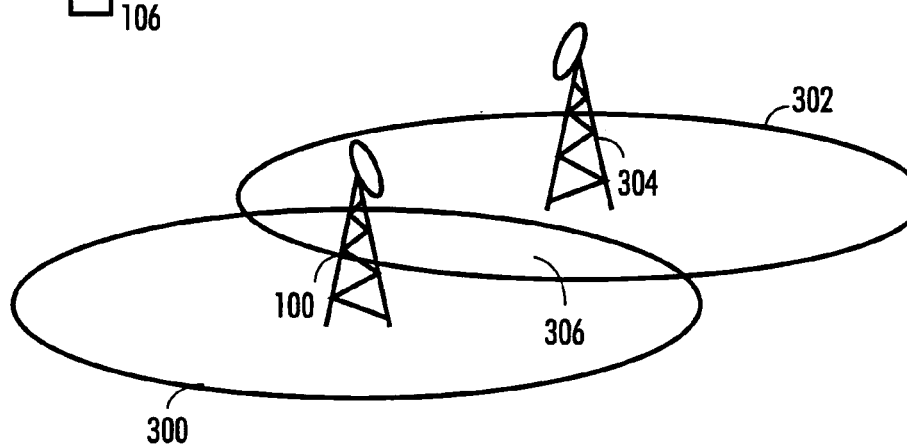
FIG. 3 illustrates the overlapping of two cells.

First an example of an overlapping situation is described. FIG. 3 illustrates the overlapping of two cells. The system of the example includes a base station 100 generating a radio cell 300, and a base station 304 generating a radio cell 302. The size of the overlapping area 306 can be changed by adjusting antenna tilting. Down-tilting reduces the overlapping area and up-tilting enlarges it. The degradation of quality and/or capacity in a cellular radio network in the case, where the overlapping area of cells is too large, arises from increased interference. The excessive overlap of the cells causes a user terminal to receive pilot signals from too many sectors. This generates other-to-own-cell interference that decreases cell capacity. Additionally, neighbor list planning becomes difficult, since in dense networks more than the maximum number of neighbors can be measured in the area of one cell. This leads to missing neighbors and interference generated from cells outside the neighbor list.

The execution of an example of an embodiment of the process of the invention starts in the block 200 in FIG. 2.

In block 202, information on interference in predetermined radio cells is gathered. The embodiment utilizes prior-art pilot-signal strength-measurements performed by user terminals, handover statistics or other corresponding information. Thus, the data source may be, for instance, periodical pilot-channel signal-strength measurements, event-based pilot-channel signal-strength measurements, soft handover statistics indicating the number of soft handovers from a cell to each neighboring cell, or the time spent in a soft handover between each determined cell pair (source cell/target cell), potentially combined with the total average power emitted by the base station during a period of time (the period of time might be, for example, relatively long or include only busy hours).

In block 204, the gathered information is arranged according to radio cell specifically for processing. The data can be arranged, for instance, into a matrix format. One example of the matrix is in FIG. 4.

Figure 4:
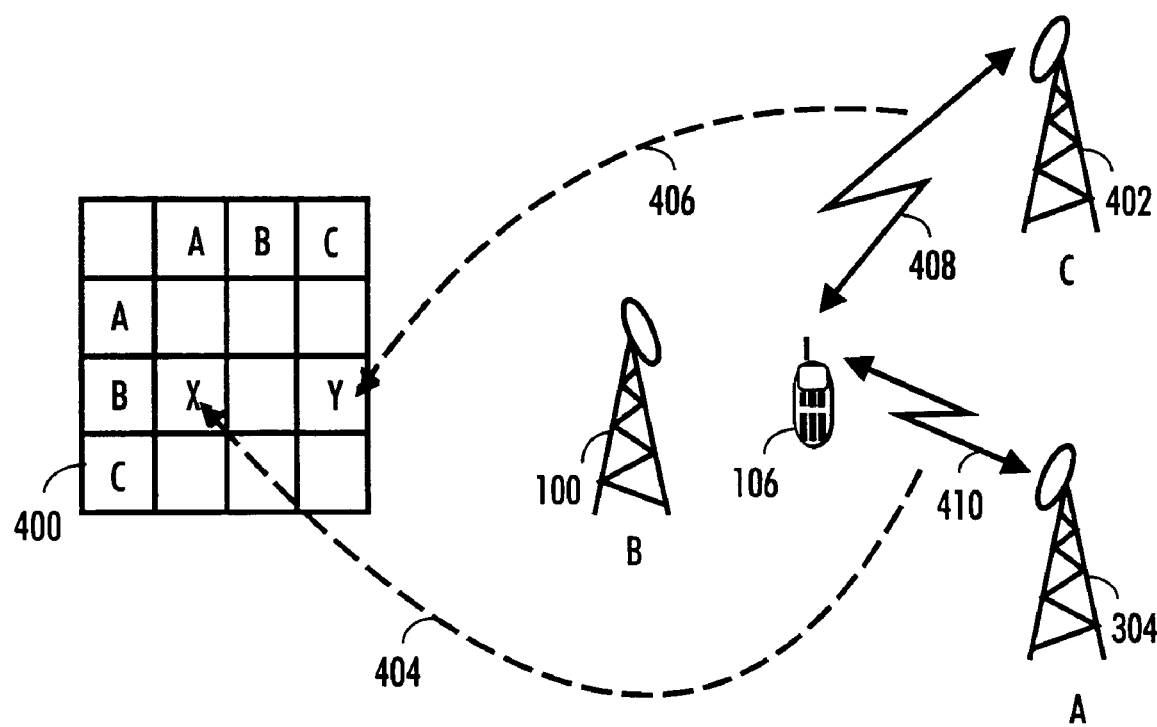
FIG. 4 illustrates an example of a situation where other-to-own cell interference is produced and how the signal strength measurement results may be arranged radio cell-specifically for processing according to one embodiment of the invention.

FIG. 4 depicts an example of a situation where other-to-own cell interference is produced and how the signal strength measurement results received from a user terminal may be arranged radio cell-specifically for processing. One example of a prior-art pilot-signal measurement carried out by a user terminal is the $E_cI_o$ (chip energy per total wideband power) measurement.

The system of the embodiment as shown in FIGS. 1, 3 and 4 includes base stations (node B) 100, 304, 402 which generate the overlapping radio cells and a user terminal 106 having radio connections 408, 410 to the base stations 304, 402. The system typically also includes a radio network controller which may be used for storing and processing the measurement information. In this embodiment, the user terminal measures the signal strengths of the pilot channels that the user terminal hears and transmits the measurement results to the base station which then forwards the signal strengths to the radio network controller.

In the matrix 400, the first row corresponds to the cell A, the second row corresponds to the cell B and correspondingly, the first column in the matrix corresponds to the cell A and the second column to the cell B. Generally speaking, a row indicates the current serving cell. The serving cell for each measurement report is the strongest of the reported cells in the active set. The active set is a set of radio links simultaneously involved in a specific communication service between a user terminal and a radio access network (RAN) access point. All other cells in the report are measured cells.

In this example, the size of the matrix is 3×3, but the size of the matrix varies according to the number of inspected cells, in other words, according to the number of measured cells.

An assumption may be made that a measurement report is transmitted by a user terminal 106, which contains three measurement samples from the cells generated by the base stations A 304, B 100 and C 402. The cells are also referred to, in this example, by the names of the base stations. The pilot signal of the base station 100 may be the strongest. Thus, the corresponding cell is the serving cell. All samples from the measurement report concerning the base station B 100 contribute to the row B in the matrix. The pilot signal strength measurement report from the cell A (x in the FIG. 4, also shown by the dotted line 404) contributes to the $E_cI_o$ matrix element whose row is B (i.e. the second row) and column is A (i.e. the first column). Correspondingly, the signal strength sample from the cell C (y in the FIG. 4, also shown by the dotted line 406) contributes to the $E_cI_o$ matrix element whose row is B and column is C (i.e. the second row and the third column). Finally, the result from the strongest cell B itself contributes to the element B in the $E_cI_o$ matrix (not shown in FIG. 4). In FIG. 4, the user terminal is connected to the cell B.

The way that a measurement result relates to a matrix element can vary. The relation may, for example, be a summation to the element's current value, but also a more complex mathematical operation. Typically, each matrix element is formed from several samples gathered from several user terminal measurement reports.

In block 206, a tilting factor, which relates to the interference that the radio cell is producing to other cells, is determined. The antenna tilting factor may be determined by calculating an average or a weighted average of the signal strength measurement results measured by user terminals. Other mathematical transformations are also possible. Tilting factor is determined for predetermined cells, which means, for example, that the tilting factor is determined for the cells in a particular geographical area. In principle, the higher the tilting factor, the more probable it is that down-tilting the antenna in that cell will improve the performance of the network. In practice, the embodiment is typically used for determining the candidate cells for tilting. Any further inspections may then be directed to the candidate cells, instead of all predetermined cells.

Next, an example of the determination of a tilting factor is explained. An element of the $E_cI_o$ matrix in a row i and column j $e_{i,j}$ can be expressed as $$e_{i,j} = \begin{cases} \frac{1}{N_{i,j}} \sum_{t=1}^{N_{i,j}} (E_cI_{o_i} - E_cI_{o_j}), & i \neq j \\ \frac{1}{N_{i,i}} \sum_{t=1}^{N_{i,i}} E_cI_{o_i}(t), & i = j \end{cases} \quad \text{Equation (1)}$$

where $N_{i,j}$ is the number of measurement reports where cell i is the serving cell and cell j is one of the measured cells, t means a measurement report, $E_cI_{o_i}$ means chip energy per total wideband power in a serving cell measured by a user terminal, $E_cI_{o_j}$ means chip energy per total wideband power in a cell j measured by a user terminal, $E_cI_{o_j}$ (t) is the $E_c/I_o$ value for the cell j in the measurement report t typically expressed as decibels (dB), Σ is a summing operation.

It is possible to calculate the tilting factor according to the equation (1) not taking the parameter Ni,j into account, which changes the average of the $E_cI_o$ values to their sum. It is also possible to determine the tilting factor in another way. The reason for proposing the calculation of the average in dB instead of linear units is that the calculation is easier to perform in decibels.

The base stations typically forward the measurement reports they receive from the user terminals to the radio network controller. Therefore, the calculation (and the information arrangement) is preferably performed in the radio network controller. If the total average power emitted by the base stations during a period of time (the period of time might be, for example, relatively long or include only busy hours) is taken into account for improving the tilting factor, then the radio network controller delivers the matrix to an OSS (operation and system support) element, for example. In the general case where cells are unevenly loaded, it is beneficial to take the total average power emitted by the base stations into account. The total average power emitted by the base stations during a period of time is taken into account in the calculation, for example, by using the following equation $$\tilde{e}_{i,j} = \frac{P_j}{\log_{10}\left(\frac{e_{i,j}}{10}\right)}, \quad \text{Equation (2)}$$

where $e_{i,j}$ is an element of the $E_cI_o$ matrix in a row i and column j,

Pj is the total average power emitted by the base station during a period of time.

The purpose of the equation (2) is to take into account that the $E_cI_o$ values are measured from a pilot channel and therefore do not reflect the total interference produced by the cell to the other cells. Taking the logarithm ($\log_{10}$) transfers the result to milliwatts from decibels.

A tilting factor may be calculated for each predetermined cell. This can be carried out by using the equation $$T_i = \sum_{j}^{n} \tilde{e}_{i,j}^k, \quad \text{Equation (3)}$$

where n is the number of rows in the $E_cI_o$ matrix, k is a weighting factor,

Σ means summing operation.

The weighting factor k is chosen appropriately to weight the selected tilting factors. Preferably, the weighting factor k determines how much a large tilting factor is weighed in order to influence the total tilting factor calculated by the equation (3). The factor k may vary according to the prevailing circumstances.

In block 208, the radio cells having the antenna tilting factors that fulfill a set criteria are searched for. There are many different options for the criteria. For instance, the criteria may be that the tilting factor exceeds the average of the antenna tilting factors by a predetermined amount (a threshold may be used).

In block 210, the antennas of the searched radio cells are tilted either up or down. Usually, the tilting is down-tilting to decrease interference. The exact amount of tilting is found by testing. The adjustment of the tilting may be continuous or gradual.

The execution of the embodiment ends in block 212. The arrow 214 depicts one possibility for repeating the embodiment.

Figure 5:
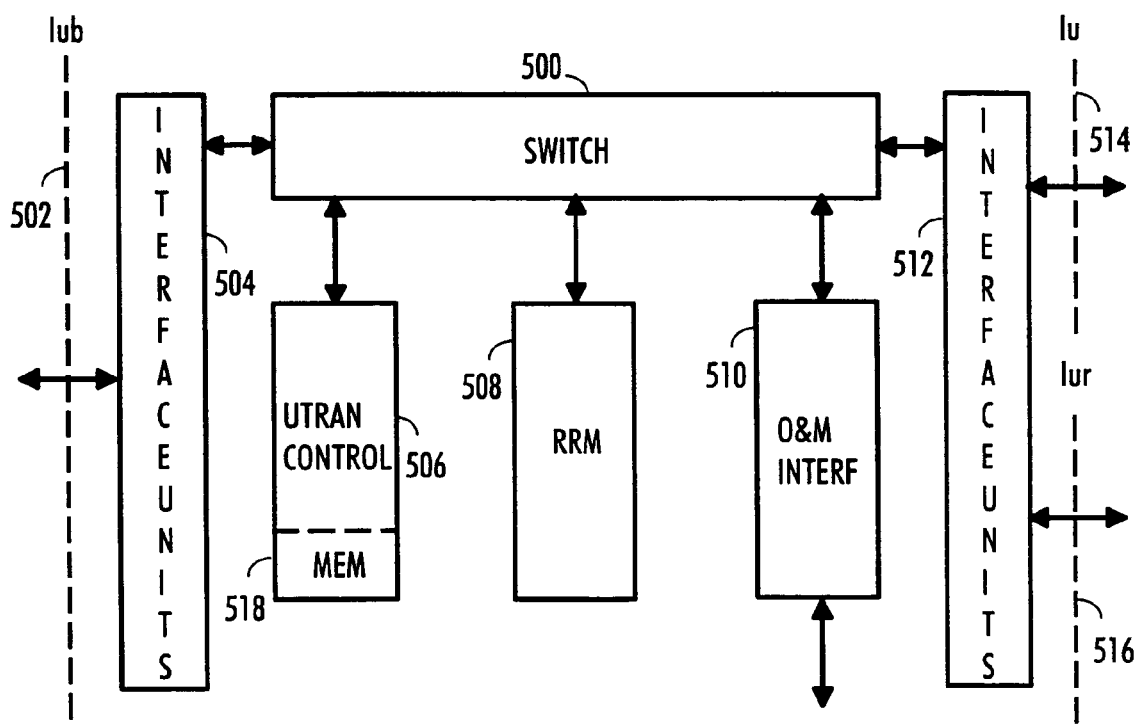
FIG. 5 shows an example of a radio network controller's logical structure.

Referring to FIG. 5, a simplified block diagram illustrates an example of a radio network controller's (RNC's) logical structure. RNC is, as mentioned above, the switching and controlling element of UTRAN. The switching element 500 takes care of the connection between the core network and the user terminal. The radio network controller is located between the Iub 502 and Iu 514 interfaces. The radio network controller is connected to these interfaces via interface units 504, 512. There is also an interface for inter-RNC transmission called Iur 516. The precise implementation of the radio network controller is vendor-dependent.

The functionality of the radio network controller can be classified into two classes: UTRAN radio resource management 508 and control functions 506. An operation and management interface function 510 serves as a medium for information transfer to and from network management functions. The radio resource management function is a group of algorithms used to share and manage the radio path connection so that the quality and capacity of the connection are adequate. Examples of radio resource management algorithms are handover control, power control, admission control, packet scheduling, and code management. The UTRAN control functions take care of functions related to the set-up, maintenance and release of a radio connection between the base stations and the user terminal. In this embodiment, the control functions additionally carry out the determining of the tilting factor, searching for the radio cells to be tilted and, if remote tilting is available, also tilting the selected antennas. In this embodiment, the control function also includes a memory unit 518 for storing the information required in determining the tilting factor in a matrix format, for instance. The memory unit may also be a separate unit.

The functionalities of the embodiment of the invention, such as arranging the information on pilot signal strength measurements and determining a tilting factor, may be carried out by the UTRAN control functions by means of software. The implementation solution can also be an ASIC (Application Specific Integrated Circuit) component, for instance. A hybrid of these different implementations is also feasible.

The antenna tilting may be done on site or remotely if the required means are available.

Even though the invention is described above with reference to an example according to the accompanying drawings, it is clear that the invention is not restricted thereto but it can be modified in several ways within the scope of the appended claims.

The invention claimed is:

1. An antenna adjustment method, comprising:
   gathering information on interference in predetermined radio cells;
   arranging the gathered information radio cell-specifically for processing;
   determining a tilting factor for at least one predetermined radio cell, wherein the tilting factor relates to the interference the radio cell produces to other cells;
   searching for the radio cells having the antenna tilting factors that fulfill a predetermined criterion; and
   tilting the antennas of the searched radio cells.

2. The method of claim 1, wherein the gathering information comprises gathering the information on the interference, which comprises pilot-channel signal-strength measurement results measured by user terminals.

3. The method of claim 1, wherein the gathering information comprises gathering the information comprising soft handover statistics.

4. The method of claim 1, wherein the gathering information comprises gathering the information comprising a total average power emitted by a base station during a predetermined period of time.

5. The method of claim 1, wherein the gathering information comprises gathering the gathered information, which is arranged in a matrix.

6. The method of claim 1, wherein the determining of the tilting factor comprises determining the antenna tilting factor by calculating an average or a weighted average of signal strength measurement results measured by user terminals.

7. The method of claim 1, wherein the searching for the radio cells comprises searching for the radio cells having the antenna tilting factors that fulfill the predetermined criterion, which is a value that exceeds the average of the determined antenna tilting factors by a predetermined amount.

8. An antenna adjustment system, configured to:
   gathering unit configured to gather information on interference in predetermined radio cells
   arranging unit configured to arrange the gathered information radio cell-specifically for processing;
   determining unit configured to determine a tilting factor for at least one predetermined radio cell, wherein the tilting factor relates to the interference that the radio cell produces to other cells; and
   searching unit configured to search for radio cells having the antenna tilting factors that fulfill a predetermined criterion.

9. The system of claim 8, wherein the information on the interference comprises pilot-channel signal-strength measurement results measured by user terminals.

10. The system of claim 8, wherein the information comprises soft handover statistics.

11. The system of claim 8, wherein the information includes a total average power emitted by a base station during a predetermined period of time.

12. The system of claim 8, wherein the arranging unit is further configured to arrange the gathered information into a matrix.

13. The system of claim 8, wherein the determining unit is further configured to determine the antenna tilting factor by calculating an average or a weighted average of signal strength measurement results measured by user terminals.

14. The system of claim 8, wherein the predetermined criterion is a value that exceeds an average of the determined antenna tilting factors by a predetermined amount.

15. A network element for adjusting antennas, comprising:
   gathering unit configured to gather information on interference in predetermined radio cells;
   arranging unit configured to arrange the gathered information radio cell-specifically for processing;
   determining unit configured to determine a tilting factor for at least one predetermined radio cell, wherein the tilting factor relates to the interference that the radio cell produces to other cells; and
   searching unit configured to search means for the radio cells having the antenna tilting factors that fulfill a predetermined criterion.

16. The network element of claim 15, wherein the information on the interference comprises pilot-channel signal-strength measurement results measured by user terminals.

17. The network element of claim 15, wherein the information comprises soft handover statistics.

18. The network element of claim 15, wherein the information comprises a total average power emitted by a base station during a predetermined period of time.

19. The network element of claim 15, wherein the arranging unit is further configured to arrange the gathered information into a matrix.

20. The network element of claim 15, wherein the determining unit is further configured to determine antenna tilting factor by calculating an average or a weighted average of signal strength measurement results measured by user terminals.

21. The network element of claim 15, wherein the predetermined criterion is a value that exceeds an average of the determined antenna tilting factors.

22. The network element of claim 15, wherein the predetermined criterion is a value that exceeds an average of the determined antenna tilting factors by a predetermined amount.

23. An antenna adjustment system comprising:
   gathering means for gathering information on interference in predetermined radio cells;
   arranging means for arranging the gathered information radio cell-specifically for processing;

determining means for determining a tilting factor for at least one predetermined radio cell, wherein the tilting factor relates to the interference that the radio cell produces to other cells; and searching means for searching the radio cells having the antenna tilting factors that fulfill a predetermined criterion.

24. A network element for adjusting antennas configured to:

gathering means for arranging information on interference in predetermined radio cells;

arranging means for arranging the gathered information radio cell-specifically for processing;

determining means for determining a tilting factor for at least one predetermined radio cell, wherein the tilting factor relates to the interference that the radio cell produces to other cells; and searching means for searching the radio cells having the antenna tilting factors that fulfill a predetermined criterion.

* * * * *